United States Patent

Yaniv

[11] Patent Number: 5,905,557
[45] Date of Patent: May 18, 1999

[54] MULTIPOLE LIQUID CRYSTAL DISPLAY WITH ALIGNMENT LAYER

[76] Inventor: Zvi Yaniv, 2270 E. Hammond Lake Dr., Bloomfield Hills, Mich. 48302

[21] Appl. No.: 08/996,223

[22] Filed: Dec. 22, 1997

[51] Int. Cl.[6] .................................................. G02F 1/1343
[52] U.S. Cl. ........................... 349/143; 349/139; 349/141
[58] Field of Search .................................... 349/143, 141, 349/139

[56] References Cited

U.S. PATENT DOCUMENTS

| | | | |
|---|---|---|---|
| 5,754,266 | 5/1998 | Ohta et al. | 349/139 |
| 5,760,857 | 6/1998 | Yanagawa et al. | 349/43 |
| 5,786,876 | 7/1998 | Ota et al. | 349/42 |

Primary Examiner—William L. Sikes
Assistant Examiner—Robert J. Hollingshead

[57] ABSTRACT

An improved efficiency liquid crystal display device (10) includes at least two pairs of electrode disposed above and below, and on two sides of each display pixel (12). Operatively associated with at least one electrode of each pair is an alignment layer. Each pair of electrodes is capable of applying an electrical field to a layer of liquid crystal material disposed therebetween. The applied electrical fields cause the liquid crystal materials to switch from a first to a second optical state corresponding to an opaque and transparent state. The result is a display device having higher optical efficiencies, and faster display response times. Multiple intermediate optical states are possible by applying varying amounts of electrical charge to the two pairs of electrodes at the same time. The alignment layer lets the liquid crystal material remain in the state set until a second field is applied.

15 Claims, 2 Drawing Sheets

MULTIPOLE LIQUID CRYSTAL DISPLAY WITH ALIGNMENT LAYER

CROSS-REFERENCE TO RELATED APPLICATIONS

This application is related to U.S. patent application Ser. No. 08/996,224, filed on date even herewith, in the name of Zvi Yaniv and entitled "MULTIPOLE LIQUID CRYSTAL DISPLAY."

TECHNICAL FIELD

This invention relates in general to flat panel display devices, and in particular to multipole liquid crystal display devices having a plurality of spaced electrodes, in both X and Y direction, for effecting a change in the optical characteristics of the liquid crystal material.

BACKGROUND

Flat panel display devices are increasingly gaining market acceptance for a variety of different applications. For example, active matrix liquid crystal displays (AMLCD's) have found widespread use as the video monitors in laptop computers, video cameras and avionic navigation modules, to name but a few devices. Other types of display devices such as electroluminescent (EL) and field emissive displays (FED's) are also used in a variety of industrial and consumer applications. The advantage of each of these types of devices resides in the fact that they are all substantially flat, particularly as compared to the cathode ray tube that has been in use for the past fifty years.

In the AMLCD, the elements which cause the device to effect a desired optical characteristic are typically sandwiched between a pair of thin glass plates. These elements include first and second patterned electrodes for applying an electrical field to liquid crystal (LC) material disposed therebetween. Each pair of oppositely disposed patterned electrodes define a single picture element or pixel. The liquid crystal material typically is a conventionally known liquid crystal material, such as twisted nematic (TN), supertwist nematic (STN), chiral smectic and others. The application of an electrical field to the LC material causes it to change its orientation from a first condition to a second condition, for example, transparent to opaque. However, in order to control the orientation of the liquid crystals, it is necessary to proved numerous other optical elements, such as at least a pair of polarizers, and a plurality of alignment layers. A conventional AMLCD is fully described in, for example, U.S. Pat. Nos. 4,666,252, 4,715,685 and 5,061,040 all to Yaniv, et al., the disclosures of which are incorporated herein by reference. An additional U.S. Pat. No. 4,961,630 to Yaniv and Baron, teach an AMLCD having three electrodes, the third electrode provided to increase device capacitance.

Unfortunately, the construction of conventional AMLCD's and STN based displays generally is that using a twisted mode configuration leads to numerous deficiencies and disadvantages. For example, the need to provide two polarizers for conditioning the optical output substantially lowers the transparency of the device. The result is a darker display or alternatively one requiring a larger, i.e., higher powered backlight. Accordingly, the polarizers either result in the need for larger backlights, increasing cost, or have poorer color intensity, resulting in diminished display performance. Additionally, at least one, and typically a pair of alignment layers are necessary for purposes of properly orienting the liquid crystal molecules upon the application or removal of the electrical field. However, these layers must be carefully applied in order to achieve perfect orientation. The steps involved in depositing and preparing the alignment layers are difficult, time consuming, and introduce numerous opportunities for defects in the devices. Accordingly, the alignment layer contributes to lower device manufacturing yields and increased device costs.

Additional limitations to conventional AMLCD's resides in the basic characteristics of the LC material. Specifically, upon application of an electric field, the LC molecules will align themselves according to the field, providing a desired optical effect. Removal of the electrical field allows the LC molecules to "relax" back to the original state of orientation. However, the speed of relaxation is considerably slower than the speed of orientation in response to the electric field. This phenomenon has severe consequences for high speed operation of AMLCD's, and in particular STN'S.

The problems noted above are further exacerbated when the device reaches higher temperatures, as can happen upon prolonged exposure to high intensity backlights. The high temperature dependency also has substantial consequences in terms of the types of application in which such a display may be used. For example, poor high temperature performance eliminates reliable use of AMLCD's in automotive applications. Operation speed is likewise deleteriously effected by lower temperatures, which substantially slow both excitation and relaxation speeds.

An additional deficiency of conventional AMLCD's relates to the relatively poor viewing angles of the devices. By this it is meant that the display appearance, at angles substantially off 90 degrees to the surface of the display, is substantially degraded. This degradation is due to the inherent characteristics of the polarized light emitted from a twisted configuration (TN, STN, etc.) AMLCD in conjunction with the need to interpose polarizers on the glass sheets.

Accordingly, there exists a need for a display device which provides the desired changes and control in optical characteristics, while avoiding the problems inherent in conventional LCD's. Such a device should be easier to fabricate, have fewer optical components, and superior optical and electrical efficiency. The devices should also be easily adaptable to conventional semiconductor fabrication techniques, or even better, to screen printing technology which is both simpler and less costly. The improved device should include means other than polarizers and alignment layers to effect the desired optical performance.

SUMMARY OF THE INVENTION

Briefly, according to the invention, there is provided a flat panel display device including at least one display pixel element, and including first and second display substrates arranged in spaced, parallel relationship, each said display substrate having at least one display electrode disposed thereon. The display further includes third and fourth display electrodes disposed between and electrically isolated from said first and second display substrate electrodes. A layer of liquid crystal material disposed between said first and second display substrate electrodes and said third and fourth display electrodes, and defining said at least one display pixel. Of course, such a display may include any number of display pixels, the number depending only on the application of the display device. An alignment layer of the type commonly known in the display industry may then be provided on each of the electrodes. In this way, it is possible to provide a display in which, once a field is applied to the liquid crystal material in order to effect a desired optical characteristic, the material will remain in that orientation without returning to the original state. As a result, a substantial savings may be realized in device operation, since a particular pixel will not need to re-addressed for every frame of information if no change in the information stored has occurred between frames.

In operation, the liquid crystal display device effects first and second optical states, corresponding to a transparent and an opaque state. These states are achieved by applying a first electrical field across the first pair of display electrodes so as to obtain said first optical state, and applying a second electrical field across the second pair of display electrodes to obtain the second optical state. Of course, it is understood that multiple states i.e., gray scale, may be accomplished via charge balancing. This is done by applying charge to both the first pair of electrodes, (the first and second display substrate electrodes) and the second pair of electrodes (the third and fourth display electrodes) in appropriately measured amounts. This will allow one to control the orientation of the liquid crystal material, and hence the optical characteristic of a single pixel and the whole display.

DETAILED DESCRIPTION OF THE PREFERRED EMBODIMENT

Figure 1:
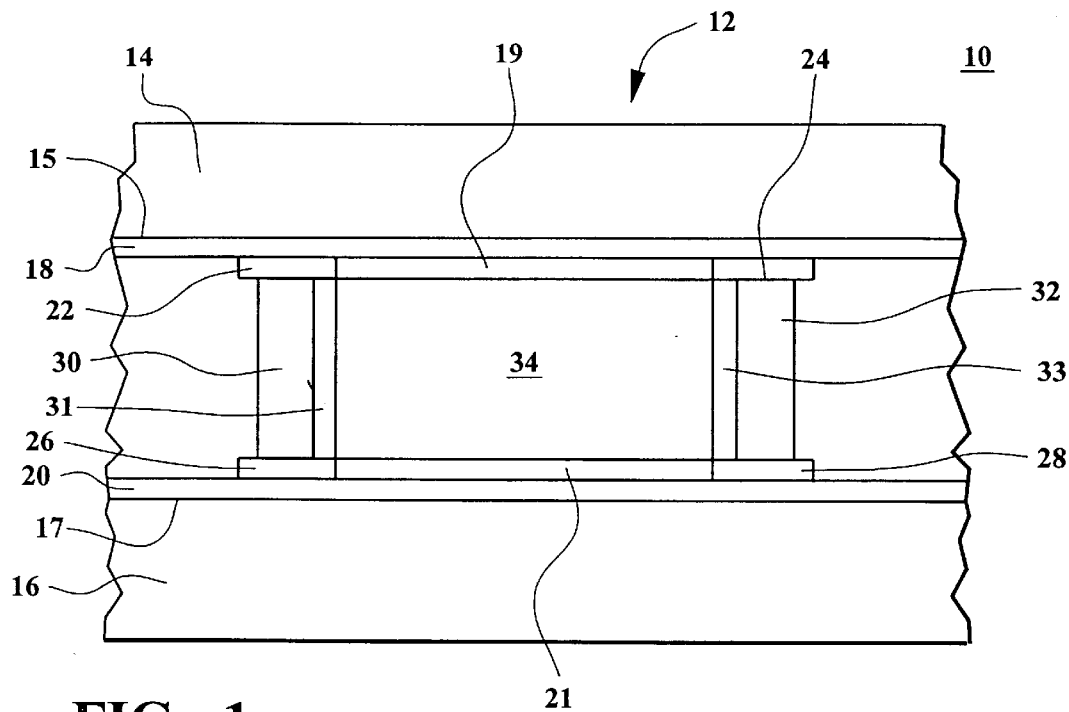
FIG. 1 is a cross sectional side view of a single liquid crystal display (LCD) pixel, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of a single liquid crystal display (LCD) 10 pixel 12, in accordance with the instant invention. It is to be noted that while but a single display pixel is illustrated in FIG. 1, the invention is not so limited. The display 10 may comprise any number of display pixels arranged in, for example, rows and columns or any other configuration.

The LCD 10 includes first and second display substrates 14 and 16 arranged in spaced, parallel relationship to one another. The substrates 14 and 16 are preferably fabricated from one of a number of known materials in the art, examples including a series of display glasses manufactured by Corning, among others. Other types of glasses, plastics, ceramics and polymers may also be advantageously employed. Indeed, transparent plastics may be advantageously employed for purposes of making flexible display devices.

Upon surfaces 15 and 17 of substrates 14 and 16 respectively is disposed layers of electrically conductive material 18 and 20. The layers of electrically conductive material are preferably substantially transparent, and may be fabricated from a transparent conductive oxide material selected from the group consisting of indium oxide, tin oxide, indium tin oxide, and other commonly known transparent conductive oxide materials. Alternatively, the layers of conductive material may be fabricated of thin metal films, doped semiconductor materials, and any of a host of other materials which may be substantially transparent and electrically conductive. These layers of electrically conductive, transparent material are the first and second substrate electrodes for the pixel 12. Disposed upon at least one of the electrodes, and preferably upon both electrodes, is a layer of an alignment material of the type commonly known in the art. The layers of alignment material, 19 and 21, are provided so as to achieve a display in which, once a field is applied to a layer of liquid crystal material in order to effect a desired optical characteristic, the material will remain in that orientation without returning to the original state, in a manner described in greater detail hereinbelow.

Disposed upon transparent conductive layers 18 and 20 are electrically insulating pads. Specifically electrically insulating pads 22 and 24 are disposed on layer 18, while pads 26 and 28 are deposited on layer 20. The function of the pads is to provide electrical isolation between the first and second substrate electrodes and the third and fourth electrodes 30 and 32 described in greater detail herein below. As will be appreciated from a perusal of FIG. 2, electrodes 30 and 32 may be fabricated as elongated rows or columns of electrode material, and hence the electrically insulating pads must therefore be disposed in like manner, i.e., as elongated rows or columns of insulating material. The electrically insulating pads 22, 24, 26, 28 are preferably fabricated of a deposited material selected from the group consisting of silicon oxide, silicon nitride, polyimide, tantalum pentoxide, and other well know insulating material, organic or inorganic, and combinations thereof. In one embodiment, the insulating material, for example silicon nitride, is deposited to a thickness of between about 0.1 and 1.0 microns (mm) and preferably 0.2 and 0.3 mm.

The third and fourth electrodes 30 and 32 are deposited on the insulating pads so as to be electrically isolated from electrodes 18 and 20. The electrodes are preferably fabricated of a material such as that described above with respect to electrodes 18 and 20. Alternatively, electrodes 30 and 32 may be fabricated from a material selected from the group consisting of metals, metal pastes, composites such as copper, and combinations thereof. In one preferred embodiment, third and fourth electrodes 30 and 32 are fabricated of, for example copper, and are deposited to a height of between 1.0 and 10.0 mm and preferably about 5.0 mm, and a thickness of less than about 10 mm. The third and fourth electrodes may be spaced apart any distance appropriate for a given application but are most preferably spaced a distance of between about 1.0 and 20.0 mm and preferably about 10.0 mm. Disposed upon at least one of the electrodes, and preferably upon both electrodes, is a layer of an alignment material of the type commonly known in the art. The layers of alignment material, 31 and 33, are provided so as to achieve a display in which, once a field is applied to a layer of liquid crystal material in order to effect a desired optical characteristic, the material will remain in that orientation without returning to the original state, in a manner described in greater detail hereinbelow. Accordingly, the electrodes 30 and 32 will work cooperatively with the liquid crystal material to achieve a display in which once the state or orientation of the liquid crystal material is set, it will remain in that condition until changed by the application of a different electrical field. Accordingly, the third and fourth electrodes will function in the manner described hereinabove with respect to electrodes 18 and 20. In both cases, substantial savings in terms of display addressing may be achieved. This is due to the fact that when transmitting, for example, display information at video rates, often information stored on a particular pixel will not change from on frame to the next. However, with conventional AMLCD's every display pixel must be addressed every frame, as relaxation effects in the liquid crystal material cause it to return to its original state, even if there has been no change in the information to be stored on the pixel. Accordingly, the pixels of a display must all be updated, every frame. If however the state of the liquid crystal material does not change once set, then it need not be updated every frame, unless the information stored on that pixel changes from frame to frame. This represents a substantial improvement in the operation of current liquid crystal display devices.

Figure 2:
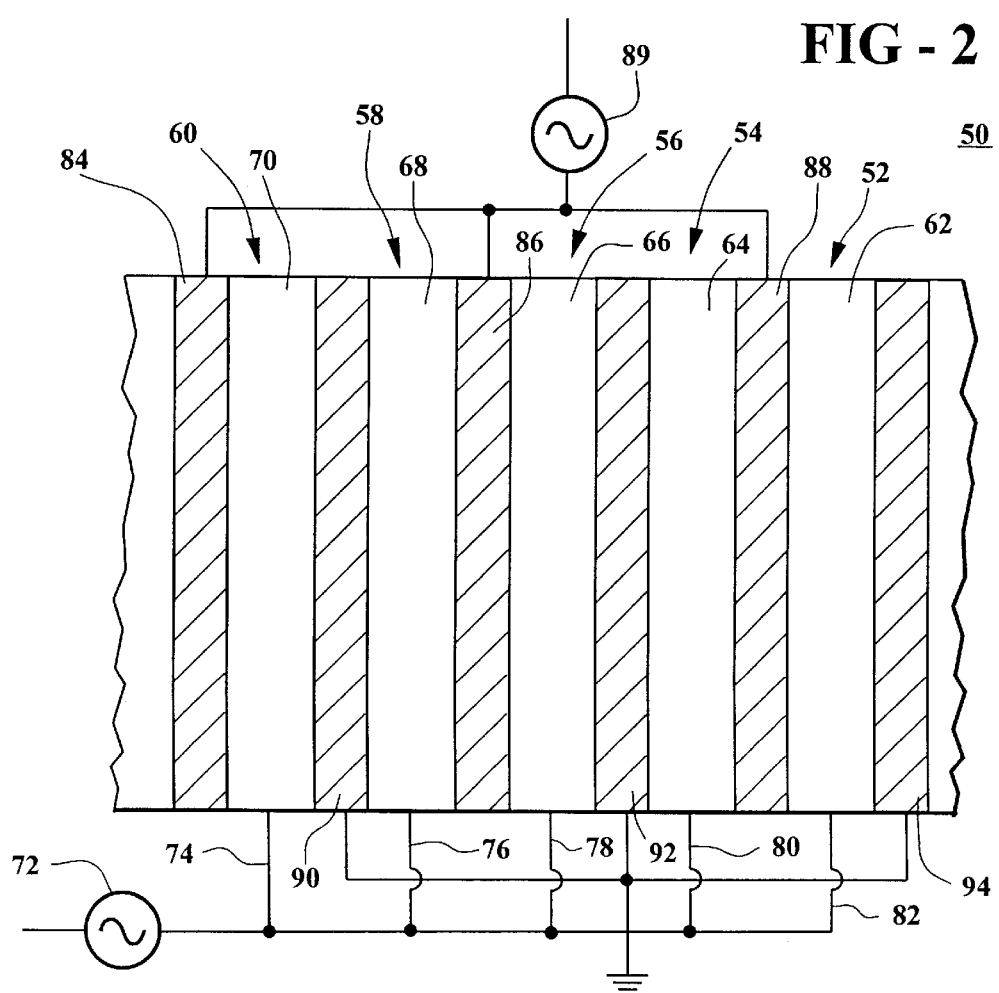
FIG. 2 is a schematic view, from above, of an LCD in accordance with the instant invention.
Figure 3:
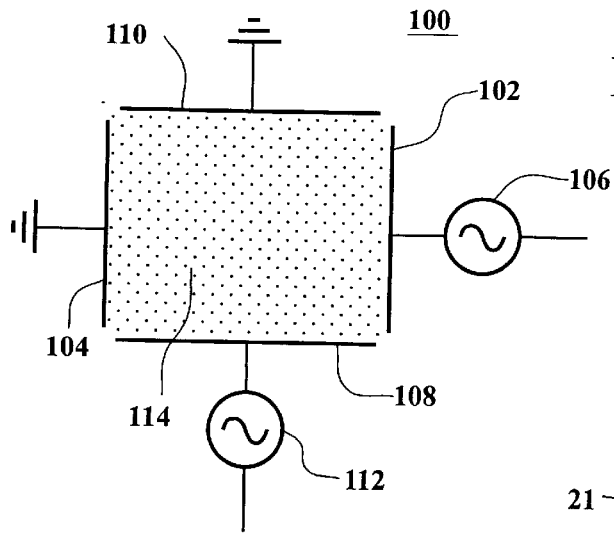
FIG. 3 is a schematic diagram of the electrical features of an LCD, in accordance with the instant invention.

It may be appreciated from a perusal of FIG. 2 that the spacing of the electrodes will define the size of the display pixel. The third and fourth electrodes also provide the advantage of acting as spacers between the first and second substrates. It is a well known problem in the liquid crystal display industry that, because the two thin glass substrates tend to curve towards each other, spacers need to be provided in the LC material in order to maintain absolutely uniform spacing, and hence proper device operation. Prior art attempts to accomplish this have met with varying degrees of success. Hence, the structure of the instant display solves another long standing problem in the industry.

Disposed between electrodes 18, 20, 30 and 32 is a layer of liquid crystal material 34. The liquid crystal material is preferably a nematic type material such as a twisted nematic or supertwist nematic liquid crystal material. Other types of liquid crystal material may also be employed. The important feature of the material is that it have first and second orientations. That is, the molecules of material line up in first and second conditions effecting first and second optical states such as transparent or opaque.

Referring now to FIG. 2, there is illustrated therein a schematic view, from above, of an LCD 50 in accordance with the instant invention. As the view of FIG. 2 is from above, only one of the display substrates i.e., the first display substrate, is visible. The LCD comprises five columnar pixels 52, 54, 56, 58, 60, though it is to be understood that a display according to the instant invention may comprise any number of pixels, in any shape and any configuration. Each pixel 52, 54, 56, 58, 60 includes a first display substrate electrode 62, 64, 66, 68, 70 electrically coupled to a power source 72 via conductive line 74, 76, 78, 80 and 82. The power source supplies an electric field to each pixel for purposes of changing the orientation of LC material disposed therein. The supplied electric field passes to ground via the second display substrate electrode of FIG. 1, not show in FIG. 2.

The display 50 further comprises a plurality of third electrodes 84, 86 and 88 electrically coupled to a second power source 89 and a plurality of fourth electrodes 90, 92, 94 all electrically coupled to ground. As described above, an electrical field is applied to each pixel 52, 54, 56, 58, 60 by pairs of the third and fourth electrodes. In particular, pixel 52 has an electrical field applied to it by third electrode 88 which field is coupled to ground via electrode 94. Similarly, pixel 54 has a field applied to it via third electrode 88 which passes to ground via fourth electrode 92.

As may be further appreciated from a perusal of FIG. 2, disposing two such displays in an orthogonal relationship will yield the equivalent of an active matrix LCD, without the need to provide the active addressing components which contribute so substantially to the cost of such devices. Also, it is to be noted that the display device described in FIGS. 1 and 2 do not require the other optical components characteristic of AMLCD'S. In particular, no polarizers are required for the display of the instant invention, nor are alignment layers required. This substantially reduces both the cost and complexity of manufacturing a display.

Referring now to FIGS. 3–6 there is illustrated therein a schematic diagram of the electrical features of an LCD, in accordance with the instant invention, from which the operation of an LCD in accordance with the instant invention may be understood. A single pixel 100 is illustrated which includes four electrodes arranged in pairs of two, as described hereinabove. The first pair of electrodes includes electrodes 102 and 104, in which electrode 102 is coupled to a power source 106, while electrode 104 is coupled to ground. The second pair of electrodes includes electrodes 108 and 110, in which electrode 108 is coupled to a power source 112, while electrode 110 is coupled to ground. Operatively associated with each of the four electrodes is an layer of an alignment material as described above. Liquid crystal material 114 is disposed between the electrodes.

Figure 4:
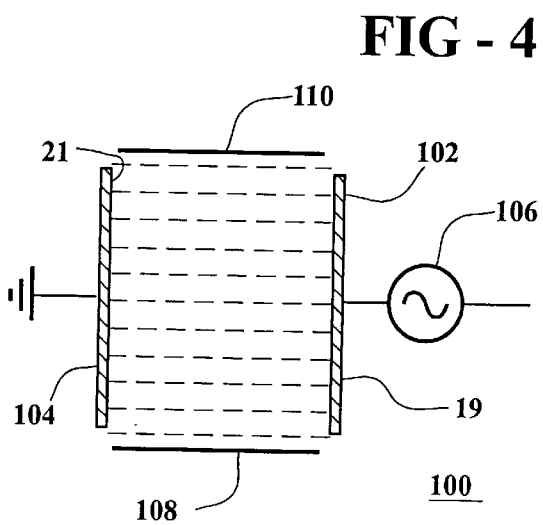
FIGS. 4–6 illustrate operation of an LCD in accordance with the instant invention.

In operation, and as is illustrated in FIG. 4, a first electrical field is applied to the liquid crystal material 114 via electrodes 102 and 104 causing the molecules of the LC material to align with the applied field and effecting a desired optical characteristic, for example an opaque appearance of the display pixel. Due to the presence of the alignment layers, the liquid crystal materials will remain in the set orientation until a subsequent electrical field is applied, thereby changing the orientation.

Figure 5:
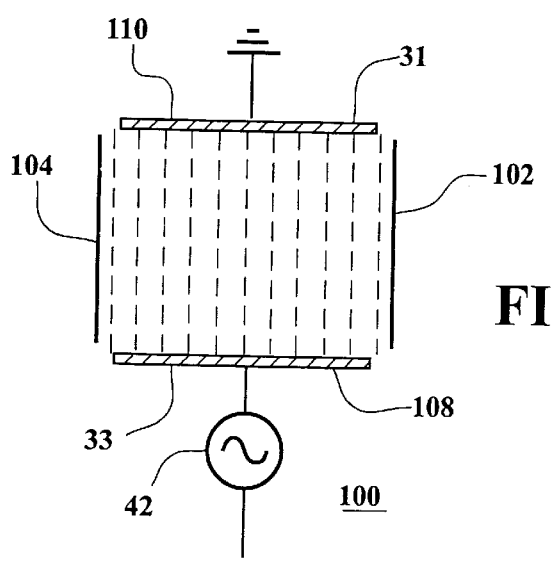

Thereafter, and as is illustrated in FIG. 5, a second electrical field is applied via electrodes 108 and 110 causing the molecules of the LC material to align themselves with the second applied field, effecting a second optical characteristic, for example transparent. The advantage of this configuration is that display operation is based only on field effects without relying on elastic modes as is the case with conventional AMLCD's. As a consequence, problems with response speed, and temperature dependency are eliminated. Again, as described above with respect to FIG. 4, the alignment layer will cause the liquid crystal material to remain in the set orientation until another electrical field is applied.

Figure 6:
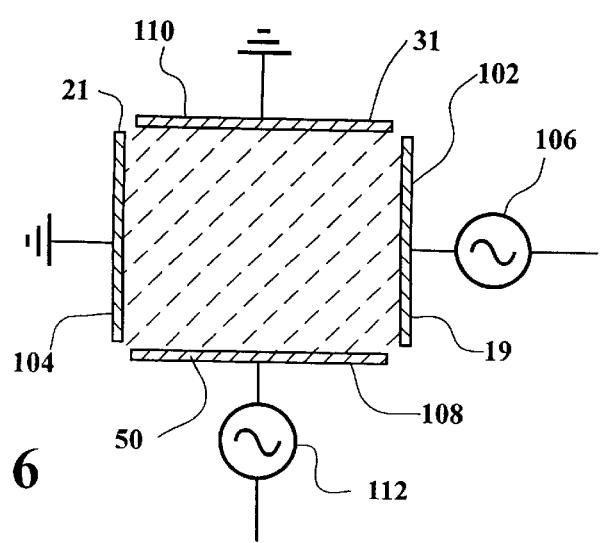

In order to achieve an optical characteristic between fully transparent (white assuming a white backlight) and opaque (black), a field may be applied to both pairs of electrodes, i.e., the first pair comprising electrodes 102 and 104, and the second pair comprising electrodes 108 and 110. This intermediary condition, known as gray scale operation, may be varied depending on the relative amounts of charge applied by each pair of electrodes. For example, assuming the operation in FIG. 4 is opaque, and FIG. 5 is transparent, by applying slightly more charge to electrodes 108 and 110 than to electrodes 102 and 104, one may accomplish a gray scale which is slightly more transparent that opaque. This is illustrated in FIG. 6. In essence, the embodiment of FIG. 6 represents an intermediate optical effect between that of FIG. 4 and FIG. 5. It will be therefore understood that a large number of intermediate optical states may be produced by simply varying the size, extent and duration of the electrical fields applied to the pairs of electrodes.

It is to be understood that the illustrations of FIGS. 3–6 are two dimensional representations of the three dimensional reorientation of the liquid crystal materials of the display. In particular, the illustrations of FIGS. 4 and 5 are such that the molecules of liquid crystal material appear to reorient from an "X" axis to a "Y" axis, both in the same plane. However, as is apparent from FIG. 1, the two pairs of electrodes are not in the same plane. Accordingly, the liquid crystal material is actually reorienting in the "X", "Y" and "Z" axis wherein the "Z" axis is perpendicular to the plane of the page on which the FIGS. appear. Viewed differently, the "Z" axis may be thought of as the directions perpendicular to the plane of electrodes 18 and 20 of FIG. 1.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A flat panel display device including at least one display pixel element, said flat panel display device comprising:

first and second display substrates arranged in spaced, parallel relationship, each said display substrate having at least one display electrode disposed thereon, and at least one of said display electrodes having an alignment layer operatively associated therewith;

third and fourth display electrodes disposed between and electrically isolated from said first and second display substrate electrodes, wherein at least one of said third and fourth electrodes has an alignment layer operatively associated therewith; and a layer of liquid crystal material disposed between said first and second display substrate electrodes and said third and fourth display electrodes, and defining said at least one display pixel.

2. A flat panel display device as in claim 1, wherein said first and second display substrate electrodes each comprise a layer of a transparent, electrically conductive material deposited on an optically transmissive substrate.

3. A flat panel display device as in claim 1, further including a layer of electrically insulating material disposed between said first and second substrate electrodes and said third and fourth electrodes.

4. A flat panel display device as in claim 1, wherein said third and fourth electrodes are electrically conductive and substantially optically transparent.

5. A flat panel display device as in claim 1, wherein said first and second display substrate electrodes are fabricated from a material selected from the group consisting of indium oxide, tin oxide, indium tin oxide, thin metal films, and combinations thereof.

6. A flat panel display device as in claim 1, wherein said third and fourth electrodes are fabricated of materials selected from the group of materials consisting of transparent conductive oxides, thin metal films such as copper, silver, aluminum, and gold, metal composites, and combinations thereof.

7. A flat panel display device as in claim 3, wherein said layer of electrically insulating material is selected from the group of materials consisting of silicon oxide, silicon nitride, polyimide, tantalum pentoxide, organic and inorganic insulating materials, combinations thereof.

8. A flat panel display device as in claim 1 wherein said display device comprises a plurality of display pixels.

9. A flat panel display device as in claim 1 wherein each display pixel comprises at least four display electrodes.

10. A flat panel display device as in claim 1 wherein said plurality of pixels are arranged in rows and columns, and wherein two adjacent rows of pixels share at least one common electrode.

11. A flat panel display device as in claim 10 wherein said common electrode is one of said third and fourth electrodes.

12. A flat panel display device as in claim 1, wherein an alignment layer is operatively associated with each of said electrodes.

13. A flat panel display device comprising a plurality of display pixels, each said pixel comprising a first electrode disposed on a first display substrate, a second electrode disposed on a second display substrate, a third electrode disposed between, and electrically insulated from said first and second electrodes, a fourth electrode disposed between and electrically insulated from said first and second electrodes, and a layer of a nematic liquid crystal material disposed between said electrodes, each of said electrodes having an alignment layer operatively associated therewith.

14. A flat panel display device as in claim 13, wherein said liquid crystal material is either a twisted nematic or supertwist nematic liquid crystal material.

15. A flat panel display device as in claim 13, wherein said first and second electrodes are arranged in spaced parallel relationship with respect to one another, and said third and fourth electrodes are arranged in spaced parallel relationship with respect to one another, and are substantially perpendicular to said first and second electrodes.

* * * * *